United States Patent
Root et al.

[15] 3,677,517
[45] July 18, 1972

[54] WRAP-AROUND DAMPER FRAME

[72] Inventors: James R. Root, Independence; Thomas D. Hill, Kansas City, Mo.

[73] Assignee: Ruskin Manufacturing Company, Grandview, Mo.

[22] Filed: March 3, 1971

[21] Appl. No.: 120,650

[52] U.S. Cl. ...................................251/366, 98/1, 98/114, 160/1, 285/424
[51] Int. Cl. ..................................F16k 27/04, F24f 13/08
[58] Field of Search .............251/366, 329, 151; 137/75; 98/1, 86, 114; 160/1, 5; 285/424

[56] References Cited

UNITED STATES PATENTS

| | | | |
|---|---|---|---|
| 3,027,135 | 3/1962 | Kellar | 251/329 X |
| 3,538,975 | 11/1970 | Metti et al. | 160/1 |
| 3,575,229 | 4/1971 | Alley | 98/114 X |

*Primary Examiner*—Arnold Rosenthal
*Attorney*—Bradley & Wharton

[57] ABSTRACT

A damper comprises a housing which defines a control opening, and a foldable blade assembly disposed in the housing for selectively blocking the flow of fluid through the opening. The damper is adapted to be disposed in a fluid conduit, and a pair of planar members are disposed on either side of the housing, with each of the members being provided with a projecting flange which is of a configuration complemental to the configuration of the fluid conduit. An uninterrupted, unitary, U-shaped frame circumscribes the housing in gripping engagement with the planar members to provide a rigid damper assembly. The bight portion of the frame overlies the members with the housing sandwiched therebetween, and the leg portions of the frame form an angle of less than 90° with the bight portion to grip the members and present a rigid damper assembly.

10 Claims, 5 Drawing Figures

Patented July 18, 1972 3,677,517

James R. Root
Thomas D. Hill
INVENTORS

BY Bradley and Wheaton
ATTORNEYS

WRAP-AROUND DAMPER FRAME

This invention relates to fluid control apparatus and, more particularly, to a damper which is adapted to be disposed in a fluid conduit.

For fluid control purposes in modern buildings, it is often necessary to place a damper in a fluid conduit where the conduit is of one cross-sectional configuration and the damper is of a different cross-sectional configuration. For example, air conduits in buildings are frequently round while dampers such as fire dampers or smoke retarding dampers are more likely to be of rectangular configuration because of the use of reversely foldable blade assemblies in such dampers. To accommodate placement of a damper of one configuration in a fluid conduit of a different configuration, it has heretofore been the practice to weld to a damper housing a frame having laterally projecting flanges on either side of the damper and in alignment with the damper opening, which flanges are complemental in configuration to that of the fluid conduit in which the damper is to be placed.

Since the flanged frame must be welded to the damper after the latter has been assembled, a highly skilled welder must normally be employed. Regardless of the workman's skill, there is always the possibility of damage to the damper from the heat of the welding arc. Also, since the damper is preferably constructed from galvanized metal, there is the danger of noxious fumes being given off during the welding process. Even if the weld is properly performed, the galvanized metal surface has been interrupted, providing an area which is susceptible to deterioration and which detracts from the overall appearance of the damper. Finally, in addition to requiring highly skilled labor and a great deal of time to assemble a damper with flanges adapted to mount the damper in a fluid conduit, flanges which are welded directly onto the damper are subject to rattling and less than perfect fit because of the inherient nature of the welding operation.

The disadvantages heretofore associated with dampers adapted to be mounted in fluid conduits when the damper is of one configuration and the conduit is of a different configuration, are eliminated in the present invention by providing a damper having mounting flanges as a part of the damper assembly, which flanges are mounted on plates at either side of the damper housing, with the plates being held in place by a circumscribing U-shaped frame which grips the plates and is secured to the housing by a fastener at each end of the frame. All welding and the inherent disadvantages associated therewith are completely eliminated.

It is therefore an object of the present invention to provide a damper adapted to be disposed in a fluid conduit of a configuration different from that of the damper wherein the possibility of damage to the damper from the welding of flanges thereon is eliminated by securing flanges through use of a circumscribing, damper-gripping frame.

Another object of the invention is to eliminate the danger of noxious fumes from the welding of galvanized metal, by providing a damper adapted to be disposed in a fluid conduit and having mounting flanges for this purpose, which flanges are secured by a circumscribing, damper-gripping frame.

Another object of the invention is to eliminate the need for highly skilled labor when constructing a damper of the type adapted to be provided with flanges for mounting the damper in a fluid conduit, by eliminating the requirement for any welding in the assembly of the damper.

Another important aim of the present invention is a damper which can be mounted in a fluid conduit of a different configuration from that of the damper, and which is much less subject to producing noise as a result of the elimination of all welds in the damper construction.

A further object of the present invention is to provide a damper which is adapted to be disposed in a fluid conduit of a configuration different from that of the damper wherein the quality of the damper is not highly dependent upon the skill of the labor used to assemble the damper as a result of the provision of component parts which can be assembled without the use of welding.

It is also one of the objects of this invention to provide a control damper which is adapted to be placed in a fluid conduit of a different configuration from that of the damper wherein the complete damper assembly, including the circumscribing damper frame, can be constructed from standard sheet metal stock.

Figure 1:
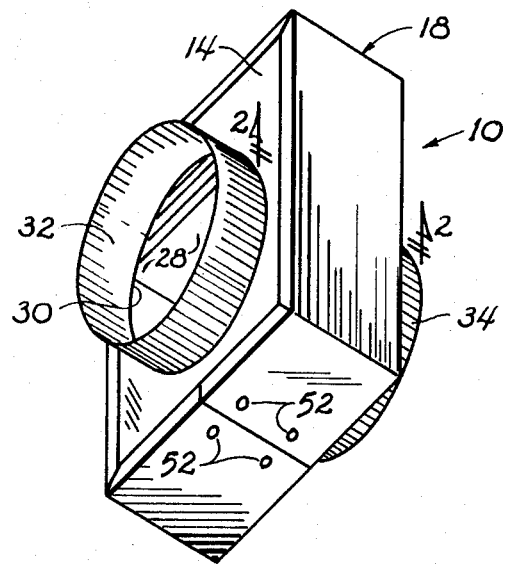
FIG. 1 is a perspective view of the damper of the present invention.
Figure 3:
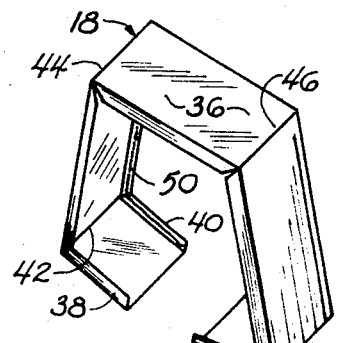
FIG. 3 is a perspective view of the damper frame which circumscribes the damper housing and secures the assembly in rigid interrelationship.
Figure 4:
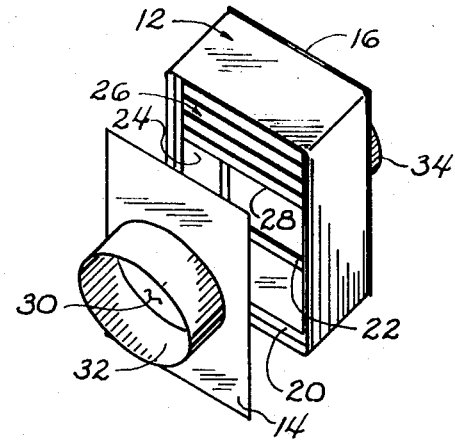
FIG. 4 is a perspective view, partially exploded, of the damper housing and the plates which mount the flanges.

The damper is designated generally by the numeral 10 and includes a generally rectangular housing 12, which is sandwiched between a pair of planar members or plates 14 and 16, and a frame 18 which is of complemental configuration to the housing 12 and circumscribes the latter. transversely The housing 12 which defines a fluid control opening, is fabricated from flat metal stock, the edges of which are turned in to present a pair of projections 20 and 22 which extend in perpendicular relationship to a generally planar housing body 24. The projections 20 and 22 extend around the inside periphery of the housing 12, as best illustrated in FIG. 4, to define a track for a foldable blade assembly 26. The blade assembly 26 is comprised of a plurality of hingedly interconnected planar blade members 28 which extend transversely across the opening presented by the housing 12. The blades 28 are shown in both FIGS. 1 and 3 in their folded or standby position wherein air can pass through the opening presented by the housing 12. The damper 10 is particularly adapted for use as a fire damper and to this end, the blade assembly 26 is normally held in its standby position by a fusible link or a continuously energized motor. When a fire occurs, either the fusible link melts or the motor is deenergized to allow the assembly 26 to fall by gravity to close the opening. It is also within the skill of the art to employ springs which bias the assembly 26 into its unfolded position in the event the damper 10 is placed in a manner where the assembly 26 is in a generally horizontal position and the forces of gravity would not be sufficient to unfold the assembly. Manifestly, the track defined by the projections 20 and 22 assures that the assembly 26 will not come out of alignment with the housing 12.

Each of the planar members or plates 14 and 16 is of rectangular configuration and each has a peripheral dimension slightly greater than the inside peripheral dimension of the frame 12 to assure that the plates 14 and 16 will remain in abutting relationship to the housing with the latter sandwiched therebetween, and will not slip into the interior of the housing. Each of the plates 14 and 16 also has an aperture or hole therethrough, such as the hole 30 of the plate 14 which is visible in FIG. 4. Finally, each of the plates 14 and 16 is provided with a laterally projecting, passage-defining skirt or flange 32 or 34 respectively, which circumscribes a corresponding hole and projects outwardly therefrom. It is to be understood, of course, that the purpose of the flanges 32 and 34 is to mount the damper housing 12 in a fluid conduit of a configuration which is different from that of the damper housing. Thus, with the housing 12 of rectangular configuration, the flanges 32 and 34 are illustrated as being of circular configuration for mounting the housing 12 in a fluid conduit which is also of circular configuration. Manifestly, other configurations for both the housing 12 and the mounting flanges 32 and 34 could be provided within the teachings of the present invention.

Figure 2:
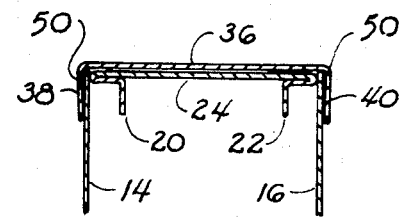
FIG. 2 is a cross-sectional view taken along line 2—2 of FIG. 1.

To secure the plates 14 and 16 to the housing 12 in a rigid manner, the frame 18 is provided. The frame 18 can also be formed from flat metal stock into a U-shaped configuration with a bight portion 36 of a transverse dimension slightly greater than the combined transverse dimension of the housing 12 and the members 14 and 16, and a pair of leg portions 38 and 40 at either side of the bight portion 36. The leg portions 38 and 40 are integral with the bight portion 36 and are disposed at an angle of slightly less than 90° relative to the latter. The frame 18 is fabricated with lines of bend, designated by the numerals 42-48 in FIG. 3, so as to present a configuration which is generally complemental to the configuration of the housing 12. It is also desirable to provide a bead of sealant 50 at the juncture between each of the leg portions 38 and 40 and the adjacent bight portion 36. This sealant makes the completed assembly essentially airtight as best understood from viewing the cross-sectional illustration in FIG. 2.

Figure 5:
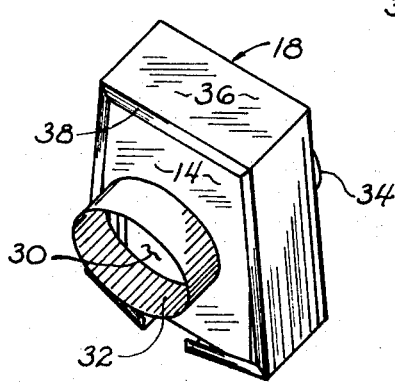
FIG. 5 is a perspective view of the assembled housing, flanges, and circumscribing frame as they would appear prior to fastening of the frame to the housing.

When the damper 10 is to be assembled, the plates 14 and 16 are moved into abutting relationship to the housing 12, as illustrated in FIG. 4, and the frame 18 is then wrapped around the assembly of the housing and the plates 14 and 16 in the manner illustrated in FIG. 5. The two ends of the frame 18 which are shown at the bottom of FIG. 5 projecting beneath the plate 14 at a slight angle, are forced under pressure into flat positions, and then secured to the housing 12 by appropriate fasteners such as rivets 52.

It is to be noted that as a result of the leg portions 38 and 40 being disposed at an angle of slightly less than 90° relative to the bight portion 36, the leg portions are able to exert a substantial gripping force on the respective plates 14 and 16 with which they are in engagement through the sealant material 50. Thus, the damper 10 is substantially airtight and is held in rigid assembly to preclude noises from loosened components. No welding is required and all of the components are precluded from relative movement by the interlocking nature of the circumscribing, wrap-around frame 18.

Having thus described the invention, what is claimed as new and desired to be secured by Letters Patent is:

1. A damper adapted to be disposed in a fluid conduit, said damper comprising:
   a housing defining a control opening;
   means coupled with the housing for blocking the flow of fluid through the opening;
   first and second planar members disposed on opposite sides of said housing with the latter being sandwiched between the members,
   each of said members having a hole therethrough and being provided with a laterally projecting passage-defining flange of complemental configuration to said conduit and aligned with said opening and said hole; and
   frame means circumscribing said housing and said members and being disposed in gripping engagement with the same to present a rigid damper assembly.

2. The invention of claim 1, wherein said frame means includes a pair of opposed flange portions for gripping said members.

3. The invention of claim 1, wherein said frame means is discontinuous to facilitate placement around said housing and including fastening means extending through said frame means and said housing at each end of the frame means to secure the latter to the housing.

4. The invention of claim 3, and a sealant material disposed between said frame means and each of said members.

5. The invention of claim 3, wherein said housing is of rectangular configuration and said frame means is provided with lines of bend corresponding to the corners of said housing.

6. The invention of claim 5, wherein said members are of rectangular configuration and are characterized by a peripheral dimension greater than the corresponding dimension of said housing whereby said members abut said housing.

7. The invention of claim 5, wherein said frame means includes a pair of opposed leg portions coextensive in length with said frame means for gripping said members.

8. The invention of claim 7, wherein said frame means includes a bight portion intermediate said leg portions to cooperate with the latter and present a U-shaped frame component.

9. The invention of claim 8, wherein each of said leg portions is integral with said bight portion and forms an angle of less than 90° with the latter whereby to enhance the gripping action of said leg portions.

10. A damper adapted to be disposed in a fluid conduit, said damper comprising:
    a rectangular housing defining a control opening;
    a blade assembly disposed in the housing and movable from a standby position to a flow-blocking position;
    first and second rectangular planar members of a larger peripheral dimension than said housing and disposed on opposite sides of the latter in abutting relationship thereto with the housing being sandwiched between the members,
    each of said members having a hole therethrough and being provided with a laterally projecting passage-defining flange in alignment with said opening and said hole and of complemental configuration to said conduit;
    a U-shaped frame component having a bight portion of greater transverse dimension than the combined transverse dimension of said housing and said members, and a pair of leg portions integral with said bight portion for gripping said members, said component being discontinuous and circumscribing said housing; and
    fastening means extending through said housing and said component at each end of the latter to secure the frame component to the housing.

* * * * *